Nov. 8, 1955
C. W. BARY
2,723,083
HEAT PUMP APPARATUS
Filed Feb. 5, 1952
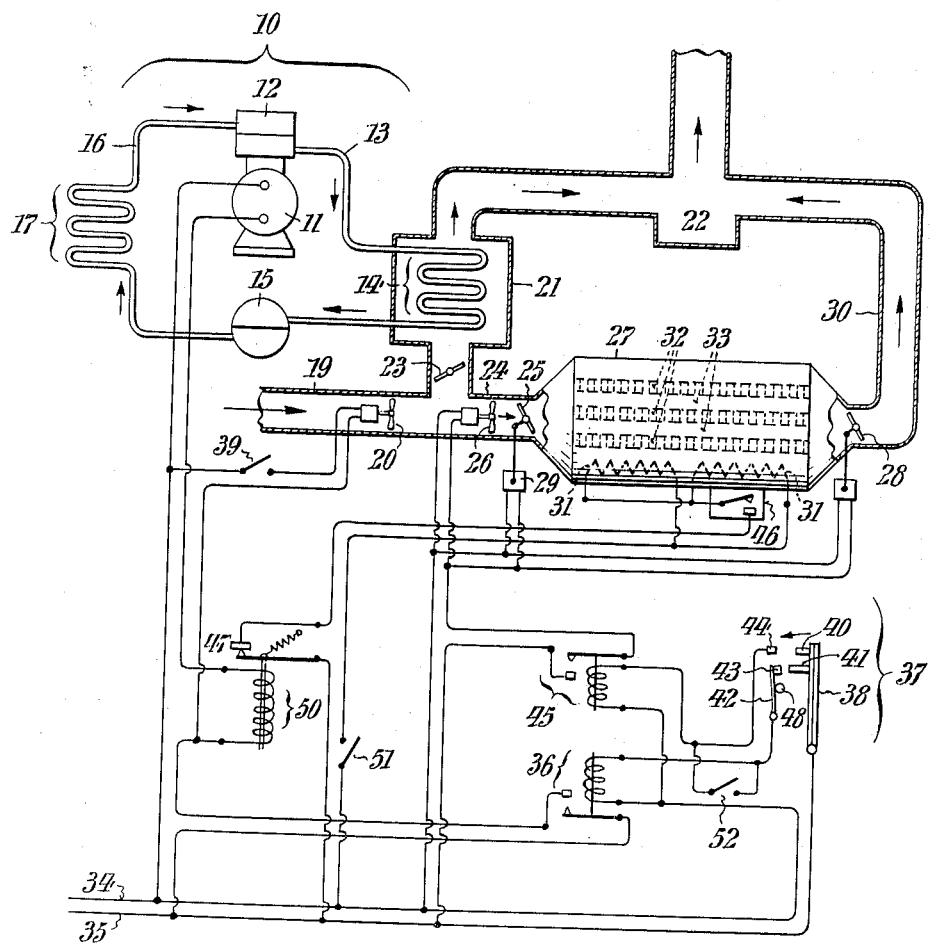
INVENTOR.
Constantine W. Bary,
BY Paul & Paul
ATTORNEYS

United States Patent Office 2,723,083
Patented Nov. 8, 1955

2,723,083

HEAT PUMP APPARATUS

Constantine W. Bary, Whitemarsh, Pa.

Application February 5, 1952, Serial No. 270,045

8 Claims. (Cl. 237—2)

This invention relates to heating apparatus operating on the heat pump principle, and more particularly concerns heating apparatus including an electrically energized heat pump which serves to heat the air in a building or other space during cold weather and also serves to cool the air in the same space during hot weather.

From a cost viewpoint it has heretofore been generally impracticable to heat houses or other buildings solely by means of electrical resistors, in that other forms of fuel such as coal, oil or gas supply heat at less cost. Moreover in most regions of the country the house-heating requirements have an inherent low annual load factor which under conventional methods of operation of electric heating plants produces a relatively low annual load factor on an electric supply system. Extreme loads are imposed upon the system for short periods during very cold weather; this requires high-capacity installations wherein said capacity is idle much of the time during an annual period.

The heat pump, using air, water or earth as its heat source, has been found to multiply greatly the effectiveness of electricity for heating purposes. It reduces substantially the quantity of electricity required for a given job of house heating as compared with the requirements of known forms of electric resistance type heating systems. However, the overall performance of conventional heat pump installations indicates that under conventional methods of operation they have not completely overcome the disadvantages previously mentioned, particularly because of the inherently low annual load factor of heating requirements and in view of the relatively high investment cost inherent in residential heat pump installations.

It is accordingly one object of this invention to provide electrically energized means including a heat pump for heating a house or other space, which would result in a relatively high annual load factor of electricity supply while satisfying heating requirements which have an inherently low annual load factor. Another object is to provide heating apparatus of this character which has a relatively low first cost but has sufficient capacity to provide the heating requirements of a house or other space during unusually cold weather.

It has previously been proposed to provide supplementary electric equipment in association with a heat pump to supply additional heat during times of peak heating demand, but this has resulted in relatively high power demands on the electric supply system. Accordingly, for use in cold or moderately cold climates, such installations required the provision of high capacity transformers, wiring and other equipment for supplying power to the heat pump apparatus.

It is accordingly a further object of this invention to provide an unusually efficient and economical heating apparatus utilizing heat pump principles. Still another object is to provide a convenient and economical electrically-energized system for heating a residence or other building. A further object is to provide, in combination with a heat pump, an electrically heated supplementary heat storage system which has capacity to furnish heat during peak conditions without requiring additional electrical heating energy at the time the heat from it is given up.

It has previously been proposed to provide a heat pump system including a heat storage system wherein the heat pump itself supplies heat to the storage system when needed and at times when the heat pump is not called upon to furnish the heat requirements of the house. However the temperature level at which heat may be stored by utilizing an economical heat pump system is limited to a relatively low value. Moreover considerable mechanical complications are encountered since additional heat transfer surfaces are required to transfer heat from the heat pump to the storage system.

It is accordingly another object of this invention to provide a heat pump system having a heat storage system capable of operating at a temperature well in excess of the temperature limit economically attainable by the heat pump. Still another object is to provide a system of this character which has a simple construction and does not require excessive additional heat transfer surfaces.

A still further object of the invention is to provide a primary electric heating system having a supplementary electric-resistor heat storage unit which is energized independently of said primary system and may be used to meet some or all of the heating requirements of a house or other building in case of a failure of said primary system.

Other objects and advantages of the invention will further become apparent hereinafter, and in the appended drawing.

The appended drawing represents a schematic view in side elevation, partly in section, of one specific embodiment of heat pump apparatus in accordance with this invention.

In describing the specific form of the invention selected for illustration in the drawing specific terms will be employed for the sake of clarity, but it is to be understood that the scope of the invention is not thereby limited.

Turning now to the specific embodiment of the invention selected for illustration in the drawing, which shows the operation of the apparatus on a heating cycle, the number 10 comprehensively designates a heat pump system which includes an electric motor 11, a compressor 12, a high pressure piping section 13 which includes the high pressure heat exchanger or condenser coil 14, an expansion valve 15 and a low pressure piping section 16 which includes a low pressure heat exchanger or evaporator coil 17. Heat pump systems of this general character are well known in the art, and the system is accordingly not illustrated in further detail herein. It will be appreciated that, in accordance with the operation of the heat pump, heat is absorbed by the heat exchanger 17 and given up by the heat exchanger 14 when operating on a heating cycle. The absorbed heat may be obtained from air, earth or any other suitable heat source. The operation of the heat pump on a cooling cycle is not specifically shown in the drawing, since this is also well known in the art.

The heat pump apparatus shown in the drawing includes an inlet duct 19 having a main blower 20 which is motor operated and constructed and arranged to blow air through said inlet duct 19 in the direction indicated by the arrow therein. Connected to the inlet duct 19 is a main duct 21 which has a manually operated damper 23 and accommodates the heat exchanger 14. The air flowing in main duct 21 absorbs heat from the heat exchanger 14. Such air passes through a mixing or plenum chamber 22 which is connected to the main duct 21, and through branch ducts (not shown) which distribute the heated air to the desired places as, for example, the various rooms of a house or other building.

The number 24 designates a supplementary duct having a normally-closed damper 25 which is operated by a motor or solenoid 29. Also mounted in the duct 24 is a supplementary duct blower 26 which is motor operated and serves to blow air through said supplementary duct 24 in the direction indicated by the arrow therein. A thermally-insulated heat storage container 27 is connected into the supplementary duct 24 and serves to heat the air flowing therethrough, as will further become apparent hereinafter. The air heated by the heat storage container 27 passes into a connecting conduit 30 in which is mounted a normally-closed motor- or solenoid-operated damper 28, and passes into the plenum chamber 22 wherein it is mixed with the air from the main duct 21.

Electric resistance elements 31 are provided in the heat storage container 27. Preferably the total electrical power demand of the electric resistance elements 31 is no greater than the maximum electrical power demand of the heat pump system 10. Also mounted in the heat storage container 27 are a plurality of material storage sections 32 which are disposed adjacent to and preferably above the electric resistance elements 31, and have capacity to absorb heat therefrom. A heat storing material, which may be water, disodium phosphate dodecahydrate, or any other suitable heat storage medium, is disposed in each of the material storage sections 32. Such material is accordingly adapted to absorb heat from the electric resistance elements 31. The material storage sections 32 are spaced apart from one another to provide air passages 33 therebetween. Air flowing through the air passages 33 is heated by contact with the surfaces of the material storage sections 32, which serve as heat exchangers.

Electric means are shown in the drawing for controlling the operation of the apparatus heretofore described. The numbers 34, 35 designate electric supply lines. The compressor motor 11 is connected through the contacts of a relay 36 and through the operating coil of a series relay 50 to the electric supply lines 34, 35. The motor of the main blower 20 is also connected to the electric supply lines 34, 35 through the contacts of relay 36 and through the manually operable switch 39. A master thermostat 37, which is preferably mounted in a room of the house or building to be heated, has contacts which are connected through the operating coil of relay 36 to the electric supply lines 34, 35. In the specific embodiment shown in the drawing, the thermostat 37 has a temperature-responsive element 38, which is illustrated as a bimetallic strip but may be any other temperature-responsive element, carrying a pair of contacts 40, 41. A flexible metal strip 42 carries a contact 43 which is disposed in the normal path of movement of the contact 41. The number 48 designates a fixed stop arranged to limit the movement of flexible strip 42 to the right. In response to a predetermined lowering of ambient temperature the upper portion of temperature-responsive element 38 moves toward the left as indicated by the arrow and the contacts 41, 43 come together. Thus the contacts 41, 43 close the circuit through the operating coil of relay 36 thereby closing the contacts of relay 36 and energizing the compressor motor 11, the coil of relay 50, and the motor of the main blower 20. Accordingly, upon demand by the thermostat 37, the heat pump system 10 is electrically energized to furnish heat to the heat exchanger 14 while the main blower 20 is electrically energized to force air through the heat exchanger 14 and into the space to be heated.

Thermostat 37 also includes a fixed contact 44 which is disposed in the normal path of movement of the contact 40. Contacts 40 and 44 are normally spaced apart from one another at slightly greater distance than the contacts 41, 43.

Upon a further predetermined lowering of the ambient temperature the upper portion of the temperature responsive element 38 continues its movement toward the left until the contacts 40, 44 engage one another. This continued movement of the upper portion of the element 38 is permitted due to the flexibility of the metal strip 42.

The operating coil of a relay 45 is connected to supply lines 34, 35 through the contacts 40, 44 and is energized by the closing of the contacts 40, 44. The contacts of relay 45 close a circuit from supply lines 34, 35, said circuit including in parallel the motor of supplementary duct blower 26, and the motors or solenoids which open the normally-closed dampers 25, 28. Supplementary air is thereby automatically forced through the duct 24, heat storage container 27, and connecting conduit 30, all in response to the action of thermostat 37.

The electric resistance elements 31 are connected electrically to the electric supply lines 34, 35 through a thermostat 46, through the normally closed contacts 47 of the relay 50, and through a manually operated switch 51 which is closed during a major portion of the heating season. Thermostat 46 controls the temperature of the heat storage medium in the heat storage container 27. The relay 50, when its coil is energized, has capacity to open the normally closed contacts 47, thereby preventing energization of the electric resistance elements 31. Accordingly it will be appreciated that the normally closed contacts 47 of the relay 50, together with the electric circuits associated therewith, constitute an electric interlocking means connected to the heat pump system and to the electric resistance elements 31 serving to prevent the energization of the electric resistance elements 31 when the heat pump system 10 is energized.

It will be appreciated that, as the temperature of the thermostat 37 drops, the contacts 41, 43 (as well as 40, 44) approach one another. When the temperature reaches a first predetermined value, the contacts 41, 43 contact one another while the contacts 40, 44 remain separate. Thus the heat pump 10 is energized independently of the supplemental heat storage system. However, when in extremely cold weather the heat pump 10 is unable to supply the heat requirements of the building and the temperature of the thermostat drops to a second predetermined value, the contacts 40, 44 close, whereupon stored heat energy is withdrawn from the storage container 27. This withdrawal of stored heat energy continues so long as contacts 40, 44 remain closed. If the supplementary heat is adequate to raise the temperature of the thermostat 37 sufficiently, the contacts 40, 44 separate from one another, thereby de-energizing the blower 26 and permitting the dampers 25, 28 to close off the supplemental heat supply.

After the coldest portion of the winter has passed, and in order to prevent any wasting of the stored heat, means are provided for draining the stored heat from the heat storage material in the container 27. A manually operable switch 51 is provided in the electric circuit connected to the resistance elements 31. This switch 51 is preferably opened and the resistance elements 31 thereby disconnected from their supply at a selected time in the late-winter or early spring months. A manually operable electric switch 52, which is open during a major portion of the heating season, is connected as indicated in the drawing and may be closed at the same time in order to cause the operation of the coils of both relays 36, 45 concurrently in response to the closing of contacts 41, 43. Heat is thus withdrawn from the heat storage container 27 and effectively utilized whenever the thermostat contacts 41, 43 close. After the stored heat has thus been withdrawn from the heat storage material, the switch 52 may be opened and the heat storage container 27 is permitted to remain inactive until sometime early in the next fall, when the switch 51 may be closed and electric power will be consumed by the resistance elements 31 to store heat in the heat storage material 32, which heat will then be utilized during the coldest portion of the winter as heretofore described.

It will be appreciated that a heat trap may be employed in place of, or in conjunction with, the damper 28 to prevent undesired convection of heat from the storage container 27 through the conduit 30. Such heat trap is well known in the art and may comprise a conduit which extends downwardly a sufficient distance from the outlet of heat storage container 27, and then upwardly to the conduit 30.

It will also be appreciated that the supplemental duct damper 25 may if desired be utilized without any supplemental duct blower 26, such damper being automatically controlled to admit or exclude air into and from the heat storage container 27. When damper 25 is open, the main duct blower 20 then furnishes air for both the ducts 21, 24 and the relative proportions of air flow may be controlled by controlling the position of damper 25 or damper 23 or both. Although the drawings disclose a plenum chamber 22 which is incorporated into the air ducts, it will be appreciated that the term "plenum chamber" as employed herein is applicable to any arrangement wherein the air ducts 21, 30 both discharge into the plenum chamber to obtain a mixing of the air streams from said ducts. Similarly certain features of the invention may be used to advantage independently of the use of other features in accordance with this invention.

It will further be appreciated that, in place of the relay 50 having its operating coil in series with the compressor motor 11, equivalent results may be obtained by using it as a potential relay in which case the operating coil is connected across the terminals of the compressor motor 11, as is well known in the art.

While I have disclosed a master thermostat 37 having a unitary construction for controlling the main and supplemental heating systems of the apparatus, it will be appreciated that two separate but interdependent (main and supplementary) thermostats may be substituted therefor. The supplementary-heat thermostat corresponding to the contacts 40, 44 may be located outside the house or building to be heated but it is preferably located in the same room as the main thermostat corresponding to the contacts 41, 43 and set to close at a temperature slightly below that of the main thermostat.

It is important to observe that, in addition to its other advantages, the heat storage container 27 constitutes a source of heat available under emergency conditions for heating a house or building. Should the heat pump 10 be shut down for any reason, such as for servicing or failure of the compressor motor 11, compressor 12 or any other part, the manually operable damper 23 may be closed or suitably adjusted, the manually operable switch 39 opened, and all or part of the incoming air heated in the heat storage container 27.

While the supplemental heat storage system and electric interlock arrangement has been shown and described in connection with an electrically energized heat pump system, some of the advantages of the invention may be attained by combining these features with electric resistance heater elements instead of a heat pump system. However the heat pump is highly preferred in this combination since many of the advantages of the invention are not attained when a resistance type heater is utilized as the main heat source.

While the invention has been described in detail with reference to one selected embodiment thereof, it may also be practiced by substituting a wide variety of modifications or equivalents for the elements shown and described herein. All such modifications, including reversals of parts and the use of certain features independently of the use of other features, are within the spirit and scope of the invention as defined in the appended claims.

Having thus described my invention, I claim:

1. Heating apparatus comprising a source of heat, a heat pump having heat absorbing means arranged to absorb heat from said source and having heat releasing means for transferring heat to the medium to be heated, means forming a passage for conducting said medium adjacent said heat releasing means to absorb heat therefrom, electric means for operating said heat pump, a heat storage container, heat storage material contained in said container, heat storage electric means associated with said container and arranged to supply heat to said heat storage material, means forming another passage for conducting the medium to be heated adjacent said heat storage material to absorb heat therefrom, and electric interlock means connected to both said electric means, said interlock being constructed and arranged to prevent any flow of electric current to the heat storage electric means whenever the heat pump is operated.

2. The heating apparatus defined in claim 1, wherein said electric interlock means comprises an electric circuit connected to supply current to said heat storage electric means, said circuit including a normally closed switch and further including means operative in response to the supply of current to the heat pump for opening said normally closed switch.

3. The heating apparatus defined in claim 2, wherein the total electrical demand of the heat storage electric means is no greater than the maximum electrical demand of the heat pump.

4. In an apparatus for heating air in a building which is exposed to natural ambient temperatures, said ambient temperatures fluctuating generally within selected climatological average limits for a major portion of the heating season but dropping below the selected lower limit during peak conditions of limited duration, the combination comprising a source of heat, a heat pump having heat absorbing means arranged to absorb heat from said source and having heat releasing means for transferring heat to the medium to be heated, means forming a passage for conducting said air adjacent said heat releasing means to absorb heat therefrom, electric means for operating said heat pump, said heat pump having capacity to satisfy the heating demands of the building during said major portion of the heating season while the ambient temperature is within said limits but having insufficient capacity to satisfy the heating demands of said building during said peak conditions, a heat storage container, heat storage material contained in said container, heat storage electric means associated with said container and arranged to supply heat to said heat storage material, said heat storage material having capacity to store heat in a quantity to supplement the heat from the heat pump to satisfy the heat demand during said peak conditions of limited duration, means forming another passage for conducting said air adjacent said heat storage material to absorb heat therefrom, and electric interlock means connected to both said electric means, said interlock being constructed and arranged to prevent any flow of electric current to the heat storage electric means whenever the heat pump is operated.

5. Heating apparatus comprising a main duct through which air may pass, a source of heat, an electrically operated heat pump having an evaporator arranged to receive heat from said source and having a condenser arranged to transfer heat to the air in said main duct, main blower means for moving air through said main duct, a storage container, a heat-storing material contained in said container, electric resistance means associated with said container and arranged for heating said material, an electric circuit through which said resistance means is energized, electric interlock means including a normally closed switch in said electric circuit and means for opening said normally closed switch whenever said heat pump is electrically operated, a secondary heat duct through which air may pass, heat transfer means for transferring heat from said storage container to the air in said secondary heat duct, conduit means for connecting the main duct and the secondary heat duct into a common enclosure, and electrically operated control means for causing air to flow through the secondary heat duct when the heat demand of the system is not satisfied by said main blower means and heat pump.

6. The heating apparatus defined in claim 5, further characterized by the fact that valve means is provided in the secondary heat duct, said valve means being normally positioned to block the flow of air through said secondary heat duct, that secondary blower means is provided for moving the air through said secondary heat duct, and that said electrically operated control means is operatively associated with both said valve means and secondary blower means for concurrently opening said valve means and energizing said secondary blower means.

7. Heating apparatus comprising a main duct through which air may pass, a source of heat, an electrically operated heat pump having an evaporator arranged to receive heat from said source and having a condenser arranged to transfer heat to the air in said main duct, means for causing said air to flow in said main duct, a storage container, a heat-storing material contained in said container, electric resistance means associated with said container and arranged for heating said material to a temperature above the temperature of the air entering said main duct, an electric supply circuit through which current flows to said electric means in said storage container, a secondary heat duct through which air may pass, heat transfer means for transferring heat from said heat-storing material to the air in said secondary heat duct, secondary means providing for the movement of air through said secondary heat duct, a main electric control circuit connected to actuate both said heat pump and said means causing air to flow in said main duct and being connected to open said electric supply circuit whenever said main electric control circuit is energized, a secondary electric control circuit connected to actuate said seondary means providing for air flow through said secondary heat duct, a thermostatic control element which is movable in response to ambient temperature change, a set of main control circuit contacts one of which is mounted on the thermostatic control element and the other of which is mounted on a flexible support, said contacts being connected into said main electric control circuit, a set of secondary-circuit contacts one of which is mounted on said thermostatic control element and the other of which is fixed relative to said thermostatic control element, said secondary-circuit contacts being connected into said secondary electric control circuit, the spacing between said secondary-circuit contacts being greater than the spacing between said main-circuit contacts when both sets of contacts are open, whereby the main electric control circuit is closed at a definite predetermined temperature and the secondary electric control circuit is closed at a somewhat lower predetermined temperature while the main electric control circuit remains closed.

8. Heating apparatus comprising a main duct through which air may pass, a plenum chamber connected to said main duct, a source of heat, an electrically operated heat pump having an evaporator arranged to receive heat from said source and having a condenser arranged to transfer heat to the air in said main duct, means for causing said air to flow in said main duct to said plenum chamber, a storage container, a heat-storing material contained in said container, electric resistance means associated with said container for heating said material, an electric circuit for supplying electric current to said electric resistance means, electric interlock means connected to prevent flow of electric current to said electric resistance means whenever said heat pump is operating, a secondary heat duct through which air may pass, said secondary heat duct being connected to said plenum chamber, heat transfer means for transferring heat from said storage container to the air in said secondary heat duct, and means for moving the air in said secondary heat duct into said plenum chamber.

References Cited in the file of this patent
UNITED STATES PATENTS

| | | |
|---|---|---|
| 2,071,178 | Roessler | Feb. 16, 1937 |
| 2,091,563 | Palmer | Aug. 31, 1937 |
| 2,096,967 | Johnson | Oct. 26, 1937 |
| 2,241,060 | Gibson | May 6, 1941 |
| 2,241,070 | McLenegan | May 6, 1941 |
| 2,289,082 | Stevenson, Jr. | July 7, 1942 |
| 2,450,983 | Osterheld | Oct. 12, 1948 |